Inventor:
WALTER W. HOFFMANN
By Spencer, Marzall, Johnston & Cook
Attys

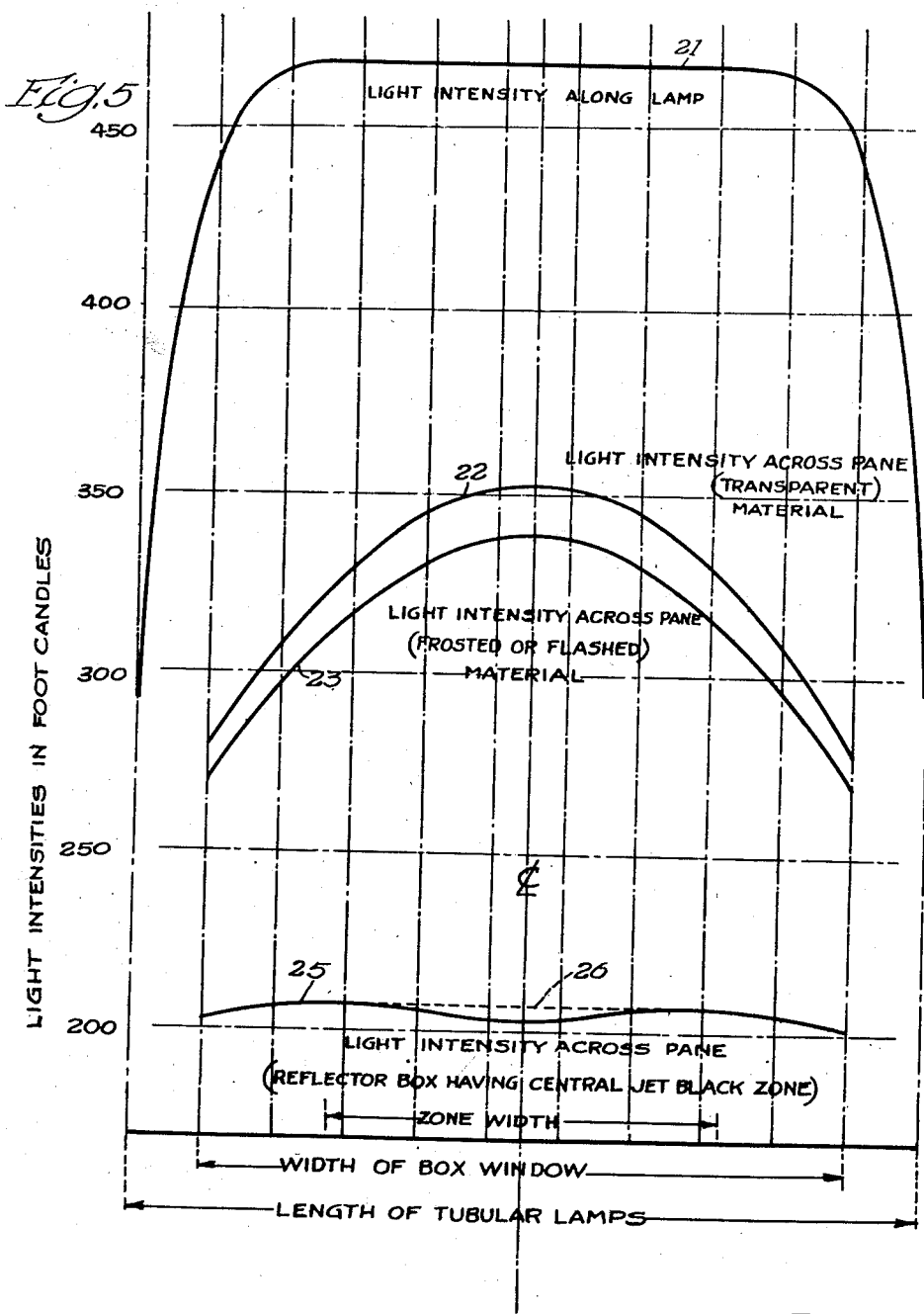

Patented Sept. 11, 1951

2,567,561

UNITED STATES PATENT OFFICE 2,567,561

UNIFORM INTENSITY ILLUMINATION FOR VIEWING BOXES

Walter W. Hoffmann, Bellwood, Ill., assignor to General Electric Company, a corporation of New York Application June 24, 1947, Serial No. 756,723

6 Claims. (Cl. 240—1)

The present invention relates in general to illumination, and has more particular reference to the control of light rays in illuminating devices, whereby to obtain substantially uniform light intensity throughout predetermined zones or areas of the illuminating device, the invention specifically relating to viewing boxes having an illuminated panel against which translucent films, sheets, and other pellicular elements may be applied for viewing purposes.

Recent developments in public health procedures contemplate the wholesale picturing of the citizenry for the production of a chest radiograph of virtually every citizen, to the end that incipient diseases, particularly tuberculosis, may be detected and treated, to thus improve the general condition of public health.

Such widespread production of radiographs entails a vast problem in the filing of full size X-ray pictures. The maintenance of files of X-ray pictures is already a difficult problem in hospitals and clinics, and with private medical practitioners having X-ray picture making equipment.

As a consequence of the foregoing, it has increasingly become the practice to make miniature photographs of full size X-ray pictures for record purposes, the full size radiograph being then destroyed and the miniature retained for file purposes. Fine grain film stock for the making of miniature photographs is available so that, if necessary, a full size enlargement picture, exactly reproducing the original radiograph, may be made at any time from the miniature record photograph.

The necessity of making accurate miniature photographs of full size X-ray film pictures, however, requires substantially uniform illumination of the original radiograph, throughout its area, as otherwise the miniature record photograph will not accurately reproduce the X-ray shadows comprising the original X-ray film picture, extreme accuracy being essential if the diagnostic value of the original is to be preserved.

Uniform intensity illumination is not an important factor in viewing the original full size radiograph for diagnostic purposes. Film viewers of the character heretofore provided, consequently, do not afford uniformity of illumination, over the film viewing area, of the character required in the making of accurate miniature file photographs; and it is an important object of the present invention to provide means for controlling light in such fashion as to provide substantially uniform illumination within a predetermined work area, to the end, specifically, that full size X-ray pictures may be uniformly illuminated throughout, and accurately photographed in miniature for record purposes. It will be apparent, however, that the principles of light control comprising the present invention are not necessarily limited to the provision of uniform intensity illumination in X-ray picture viewing boxes.

Since light sources, or lamps, inherently produce light at a point or line, or in a limited zone, in the vicinity of a finite point or line, the illumination of a panel spaced from a light source tends to be lighted at intensities varying as the square of the distance of the various portions of the illuminated panel from the light source.

The intensity of illumination of a panel, of course, may be controlled to some extent by employing several light sources and by arranging the same in relative positions to obtain maximum uniformity of illumination of the panel; but such physical arrangement of light sources, alone, or in combination with reflectors, does not, except perhaps at uneconomically high expense, provide illumination of relatively large panel areas that is sufficiently uniform for accurate miniature picturing of full size radiographs. It is, therefore, another important object of the present invention to provide simple, inexpensive means for accomplishing substantial uniformity of illumination of relatively large panel areas.

Another important object is to provide for controlling light rays in order to uniformly illuminate a panel of substantial area, by utilizing light reflective means in conjunction with light sources, such reflective means having non-reflecting or light absorbing zone or zones; a further object being to utilize the light absorbing color black at such zones for accomplishing the desired control.

Another important object is to utilize reflector means having light absorbing zones of graduated blackness, in conjunction with a light source or sources, for accomplishing the uniform intensity illumination of a panel.

Another important object resides in providing an illuminating device having a panel and light source means comprising one or more line sources of light for illuminating the panel, including reflector means, in combination with the light source means, and having a light absorbing zone or zones extending transversely of the line source of light, whereby to illuminate the panel at substantially uniform intensity in the direction of said line source of light.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 5 is a graphical representation showing typical light intensity curves.

Figure 1:
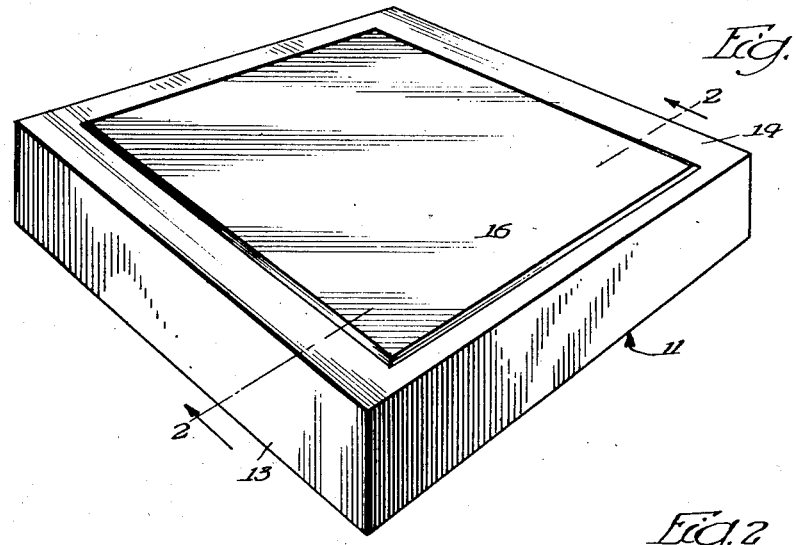
Fig. 1 is a perspective view of a viewing box embodying the present invention.
Figure 2:
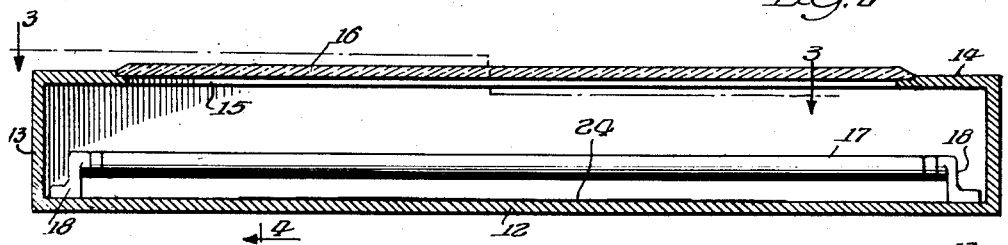
Fig. 2 is a sectional view taken substantially along the line 2—2 in Fig. 1.
Figure 3:
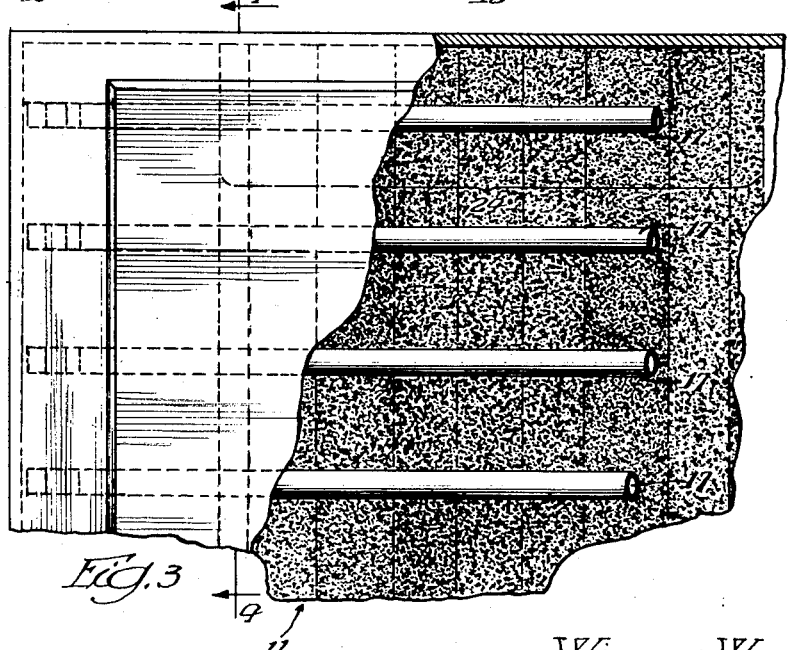
Fig. 3 is a sectional view taken substantially along the line 3—3 in Fig. 2.
Figure 4:
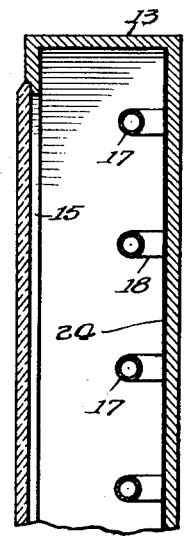
Fig. 4 is a sectional view taken substantially along the line 4—4 in Fig. 3.

To illustrate the invention, the drawings show an illuminating device comprising a box 11 embodying a shallow rectangular casing having a bottom or back wall 12, side walls 13, and a top or front wall 14. The top or front wall 14 is provided with an opening 15 fitted with a translucent panel 16, the opening and panel extending substantially throughout the entire area of the front wall 14. The panel 16 preferably comprises a pane of translucent, frosted material, such as ground or flash glass. Transparent plastic material suitably treated to render the same uniformly frosted, may also be employed, and it should be understood that the term "frosted," wherever used, herein, designates translucent light transmitting characteristics of the sort afforded by ground or so-called frosted glass.

By disposing a light source or sources within the box, and by constituting the interior surfaces thereof, especially the surface of the bottom or back wall 12, as reflecting surfaces, as by coating the same with dead white paint or enamel, the pane 16 may be illuminated to provide a panel against which films, and other pellicular members, may be disposed for viewing and other purposes. Obviously, such members applied against the pane may be illuminated for photographic reproduction thereof, if desired.

In accordance with the present invention, the source of light, disposed within the box for the purpose of illuminating the pane 16, may be of any suitable or preferred form. As shown, however, line light sources, such as the tubular lamps 17, are preferably employed. These lamps, preferably though not essentially, comprise tubular members, frosted or uniformly coated with luminescent material and thereby caused to emit light from the surfaces of the members when the lamps are in operation. The lamps 17 are preferably disposed in parallel spaced relationship transversely within the box, the lamps at their opposite ends being preferably mounted in suitable brackets 18. It is also preferable that the opposite ends of the lamps be disposed outwardly of the opposite side edges of the panel 16; that the lamps be equally spaced apart; that the medial portions of the end lamps be disposed beneath the opposite ends of the panel 16; and that the lamps be mounted in front of the back wall 12 and behind the panel 16 a distance substantially equal to the spacement between adjacent lamps.

The lamps, thus, may be mounted behind the panel in such relationship as to accomplish substantially uniform light intensity of panel illumination in a direction transversely of the lamps.

In a light box for the viewing or miniature photographing of X-ray pictures, the size of the panel 16 is necessarily of the order of two to four square feet in area, the panel comprising a square measuring from eighteen to twenty-four inches on a side, in order to accommodate a full size radiograph on and within the marginal edge of the panel.

As shown in curve 21, in Fig. 5, the light emitted by a lamp 17, as measured along the lamp at its surface, has substantially uniform intensity throughout the mid portion of the lamp representing about half of the length of the lamp, light intensity dropping off at each end of the lamp commencing at points in the lamp about one-quarter of the length thereof from each end.

The curve 22, in Fig. 5, shows the light intensity measured, across the pane 16, vertically above and in the longitudinal direction of a lamp 17, where the pane 16 comprises transparent material. The curve 23 represents light intensity measured, across the pane 16, vertically above and in the longitudinal direction of a lamp 17, where the pane comprises frosted material. It will be noted that light intensity at the pane is a maximum along its center line only, dropping off rapidly and progressively toward each side edge. These curves show intensity conditions where the interior of the box, including the inner surface of the back wall 12, is dead white throughout, and it will be seen that the variation of intensity between the central and marginal areas, as shown by the frosted pane curve 23, represents a variation of approximately 70 foot candles in 270, or 26%. The intensity variation shown by the clear pane curve 22 is only slightly greater than the variation shown by the frosted pane curve 23, both curves having substantially the same shape.

An important object of the present invention is to provide for the substantially uniform illumination of the panel 16 in the direction of the lamps. This is accomplished by providing a light absorbing zone or zones 24, on the light reflecting surfaces of the panel 12 behind the lamps 17. This zone 24 extends in a direction transversely of the lamps 17 and is disposed on the reflecting surface medially between the opposite side edges of the panel 16. The zone 24 may conveniently be formed by applying a film of light absorbing material, such as black paint, upon the reflecting surface of the panel 12. Preferably dead black color is utilized to form the zone 24, although the zone may comprise bands of graduated blackness, including shades of gray, to afford differential light absorption in the light absorbing zone, such graduated portions preferably being duplicated on opposite sides of the transverse center line of the device, so that the light absorbing character of the zone 24 will be identical on each of the opposite sides of said center line.

If desired, the zone 24 may comprise a strip of black material, such as paper, applied to the panel 12 in centered position extending transversely behind the lamps 17.

By thus applying a centered light absorbing zone, of selected size, the intensity of illumination of the panel 16 may be rendered substantially uniform in the direction of the lamps 17, it being remembered that the lamps themselves are arranged to accomplish substantial uniformity of illumination in the direction transversely of the lamps.

As shown by curve 25, in Fig. 5, the application of a uniformly black light absorbing zone having width, in the direction of the lamps, substantially equal to two-thirds of the width of the panel 16, the intensity of illumination at the center line of the panel, transversely of the lamps, may be equalized with the illumination intensity at the marginal edges of the panel, the intensity of illumination being a maximum substantially midway between the transverse center line and the marginal edges of the panel; but such maximum degree of illumination being but slightly higher than the intensity of illumination along the center line and at the edges of the panel. As shown by curve 25, the variation between maximum and minimum illumination zones within the area of the panel amounts to no more than 5 foot candles, with a maximum intensity of 210 foot candles, that is to say, a variation of about 2.5%, or average over-all illumination ±1.25%. This is well within limits required in the miniature photography of X-ray pictures, and may be accomplished by the mere application of a light absorbing zone of uniform black color, as a medial zone occupying approximately two-thirds of the width of the reflecting surface. Even greater uniformity may, of course, be attained by controlling the light absorptive characteristics of the zone 24 transversely of the lamps 17. For example, by making the central portions of the zone 24 relatively more reflective than the portions thereof on opposed sides of said central portion, the light intensity curve 25 may be made uniform in its central portions as indicated at 26. By affording maximum reflectivity at the outer marginal edges of the reflector 12, by decreasing reflectivity thence inwardly toward the center and by providing a central area of somewhat greater reflectivity, the intensity curve may be made entirely flat.

For practical purposes, however, it is ordinarily unnecessary to utilize other than the single central zone of uniform blackness, since the same affords uniformity of illumination entirely adequate for most practical purposes. The present invention, however, includes the utilization of a zone comprising areas of unlike absorptive characteristics, or a zone of graduated adsorptivity, for the purpose of obtaining exact uniformity of illumination.

Controlled light absorption, in accordance with the present invention, may also be accomplished by applying the absorbing means on the lamps rather than on the reflector 12, or by applying the absorbing means on both lamps and reflector. To this end, for instance, a film or coating of absorptive paint may be applied on the sides of the lamps 17 which face away from the panel 16; and such paint film may be of graduated absorptivity, if desired. Such paint coating or film may be applied at the medial portions of the lamps, the coating being omitted at the end portions thereof. The invention is, of course, not necessarily limited to tubular lamps, but may have application in connection with bulb lamps and other so-called point sources of light, as by providing reflectors having light absorbing zones inwardly of the marginal edges of the reflectors.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Illumination apparatus comprising a translucent panel, a plurality of parallel, equally spaced apart tubular lamps forming line light sources substantially equally spaced behind and parallel to said panel, and a reflector disposed behind said lamp in position to reflect light received therefrom upon said panel to illuminate the same, said reflector embodying transversely extending portions comprising light reflective zones of unlike reflectivity extending transversely with respect to said tubular lamps, said zones including a central zone of minimum reflectivity and outer zones of maximum reflectivity, respectively, extending behind the central and outer portions of said lamps, and zones of intermediate reflectivity disposed behind said lamps intermediate said central and outer zones.

2. Illumination apparatus comprising a translucent panel, a plurality of parallel, equally spaced apart tubular lamps forming line light sources substantially equally spaced behind and parallel to said panel, and a reflector disposed behind said lamps in position to reflect light received therefrom upon said panel to illuminate the same, said reflector embodying transversely extending portions comprising light reflective zones of unlike reflectivity extending transversely with respect to said tubular lamps, said zones including a central zone of minimum reflectivity and outer zones of maximum reflectivity, respectively, extending behind the central and outer portions of said lamps.

3. Illumination apparatus comprising a translucent panel, a tubular lamp forming a line light source spaced behind and parallel to said panel, and a reflector disposed behind said lamp in position to reflect light received therefrom upon said panel to illuminate the same, said reflector embodying transversely extending portions comprising light reflective zones of unlike reflectivity extending transversely with respect to said tubular lamp, said zones including a central zone of minimum reflectivity and outer zones of maximum reflectivity, respectively, extending behind the central and outer portions of said lamp.

4. Illumination apparatus comprising a translucent panel, a tubular lamp forming a line light source spaced behind and parallel to said panel, and a reflector disposed behind said lamp in position to reflect light received therefrom upon said panel to illuminate the same, said reflector having progressively increasing reflectivity from the portions thereof disposed behind the mid portion of the lamp toward the opposite ends of the reflector disposed behind the ends of the lamp.

5. Illumination apparatus comprising a translucent panel, a tubular lamp forming a line light source spaced behind and parallel with said panel, and a reflector parallel with said panel and disposed behind said lamp in position to reflect light received therefrom upon said panel to illuminate the same, said reflector having a central band of substantially black pigment extending thereon transversely of said light source, parallel shaded side bands adjacent and on opposite sides of said central band, said side bands comprising grey pigment in progressively lighter shades, outwardly of said central band, and end bands of flat white pigment at the opposite ends of said reflector, outwardly of said shaded side bands.

6. Illumination apparatus comprising a translucent panel, a plurality of parallel, equally spaced apart tubular lamps forming line light sources substantially equally spaced behind and parallel with said panel, and a reflector parallel with said panel and disposed behind said lamps in position to reflect light received therefrom upon said panel to illuminate the same, said reflector forming a surface facing said panel and coated with white pigment forming spaced apart end zones at the opposite ends of the panel and transversely of said lamps, a central band of substantially black pigment upon said surface and extending transversely of said lamps medially between said spaced apart end zones, and parallel shaded side bands adjacent and on opposite sides of said central band and extending thence to said end zones, said side bands comprising grey pigment in progressively whiter shades from the central band to said end zones.

WALTER W. HOFFMANN.

REFERENCES CITED

The following references are of record in the file of this patent:

UNITED STATES PATENTS

| Number | Name | Date |
|---|---|---|
| 1,953,471 | Eich | Apr. 3, 1934 |
| 2,141,139 | Howe et al. | Dec. 20, 1938 |
| 2,318,716 | Rolph | May 11, 1943 |
| 2,347,665 | Christensen et al. | May 2, 1944 |

FOREIGN PATENTS

| Number | Country | Date |
|---|---|---|
| 262,898 | England | Dec. 23, 1926 |